Figures 1, 2, 3:
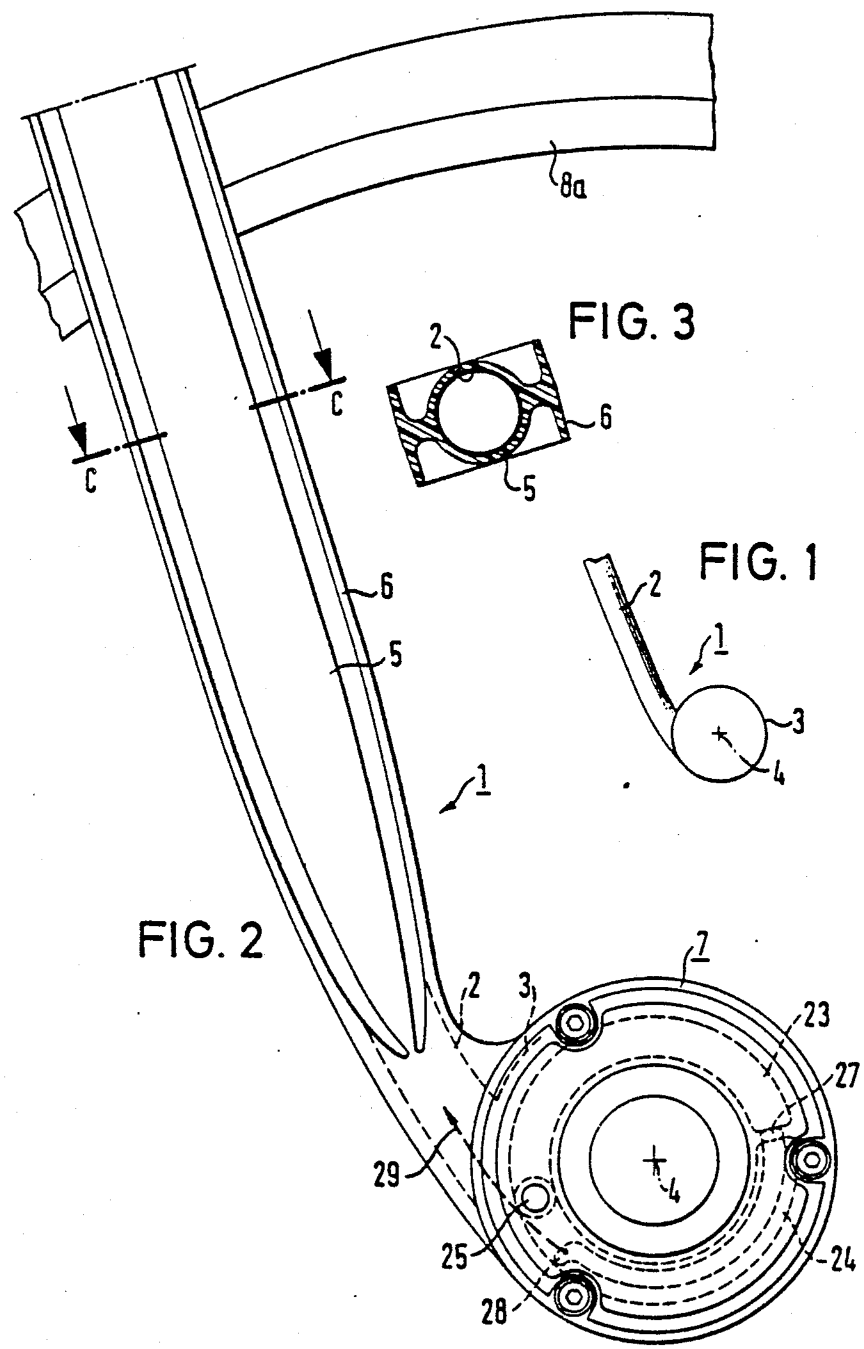

United States Patent [19]

Küpper et al.

[11] Patent Number: 4,659,097

[45] Date of Patent: Apr. 21, 1987

[54] BICYCLE

[75] Inventors: Gerd Küpper, Bad Salzuflen; Siegfried Zabinski, Bielefeld; Burghardt Vossen, Gütersloh, all of Fed. Rep. of Germany

[73] Assignee: Durkopp System Technik GmbH, Bielefeld, Fed. Rep. of Germany

[21] Appl. No.: 764,248

[22] Filed: Aug. 9, 1985

[30] Foreign Application Priority Data

Dec. 28, 1984 [EP] European Pat. Off. ........ 84116441.1

[51] Int. Cl.4 ........................ B62M 9/02; B62K 25/02

[52] U.S. Cl. ................................ 280/281 R; 280/274; 280/279; 280/281 B; 280/288; 280/261

[58] Field of Search ............... 280/279, 276, 270, 274, 280/288, 289 R, 289 WD, 281 R, 281 B, 261

[56] References Cited

U.S. PATENT DOCUMENTS

| | | | |
|---|---|---|---|
| 2,329,249 | 9/1943 | Carlson | 280/289 D |
| 2,834,610 | 5/1958 | Kurz | 280/289 D |
| 4,170,369 | 10/1979 | Strutman | 280/288 |
| 4,230,332 | 10/1980 | Porsche | 280/281 B |
| 4,513,986 | 4/1985 | Trimble | 280/281 R |

*Primary Examiner*—John J. Love
*Assistant Examiner*—Donn McGiehan
*Attorney, Agent, or Firm*—Workman, Nydegger & Jensen

[57] ABSTRACT

The invention relates to a bicycle, the frame (31) of which is connected to a single-arm drive extension (30) which, at its rear end, has firmly connected to it a rear wheel axle **(11*a*) which is rotatably mounted and can be driven by a drive device (38,33,34,35), onto which rear wheel axle (11*a*) the rear wheel can be attached from one side. Moreover, the front wheel holder connected to the bicycle frame (31) is designed as a monospar fork (1), with the front wheel axle (11) being firmly connected to the monospar fork (1) for accommodating the front wheel on one side. The wheels (8*a*,8*b*) have wheel hubs (9*a*,9*b*) which are designed in half shell shapes and are open towards the axle bearing devices (12,13,14), with a break device (22), which is firmly connected to the axle bearing device, being arranged within at least one half shell shaped wheel hub, which brake device (22) can be pressed against the inner peripheral surface of a wheel hub (9*a*, 9*b*) for braking the bicycle. The bicycle according to the invention, apart from identical wheels, has practically identical axle bearings and brake devices for the front and rear wheels, which are protected from external influences by the wheel hubs. By releasing only one screw (20)**, it is possible to change a wheel without dismantling the brake devices.

14 Claims, 16 Drawing Figures

19 20 21 9b 23 8b 24 22 28 29 30 10 14 15 27 36 11a 32 34 16 33 35 30c

8a
C
C
2
6
5
1
3
4
7
23
27
29
25
24
28

8a
1
2
5
22
23
15
18
9a
12
14
10
20
13
16
4
11
21
17
19
24
3
B
26
7

2
5
1
9a
4
8a 8b
30
30c
29
28
22
23
9b
21
20
19
10
24
14
15
27
36
11a
32
34
16
33
35

47
50
51
52
53
53a
54
54a
55
56
57
58
30
30a
30b
A

BICYCLE

The invention relates to a bicycle having a bicycle frame, identical front and rear wheels, a front wheel holder, rotatably connected to the bicycle frame, for rotatably mounting a front wheel axle onto which a front wheel can be attached, a single-arm drive extension connected to the bicycle frame, which drive extension, at its rear end, has firmly connected to it a rear wheel axle which is rotatably mounted and can be driven by a drive device, onto which rear wheel axle the rear wheel can be attached from one side, and having a brake device.

Such a bicycle is already known from European patent application No. 82 110 593.9. It has a front wheel fork with two short fork tubes into which the fork prongs can be inserted. Bearing devices for accommodating a front wheel axle are provided at the lower end of the forked prongs. A front wheel can be connected to this front wheel axle, which front wheel is positioned between the fork prongs. Moreover, the front wheel axle carries a brake device which consists of a brake disk arranged on the front wheel axle and further brake devices which are connected to at least one fork prong.

Assembling or changing such a front wheel takes a relatively long time, because the entire wheel-axle-brake combination must first be removed from the fork so that the wheel can be released from the axle. In this connection, there is also a risk of the brake device being damaged. Moreover, it is permanently exposed, so that it can also be easily contaminated. This also applies to the rear wheel.

Moreover, the front wheel fork consists of three parts which are relatively expensive to manufacture. Additional operations are also required for assembling the front wheel fork.

In the known bicycle the wheels can be identical. However, this does not apply to the axles or the axle bearing devices, because the rear wheel axle is mounted on one side of the drive extension, and the front wheel axle is mounted at both ends by means of the cork prongs. Because of the different axle bearing devices the bicycle becomes more expensive to manufacture and assemble, which results in higher costs.

The object of the invention is to further develop a bicycle of the abovementioned type in such a way that the manufacturing and assembly process is simplified with a simultaneous increase in brake reliability and reduction in bicycle weight.

This object is achieved when the front wheel holder connected to the bicycle frame is designed as a monospar fork, the front wheel axle is firmly connected to the monospar fork for accommodating the front wheel on one side, the wheels have wheel hubs which are designed in half shell shapes and are open towards the axle bearing devices, and that a brake device, which is firmly connected to the axle bearing device, is arranged within at least one half shell shaped wheel hub, which brake device can be pressed against the inner peripheral surface of the wheel hub in order to brake the bicycle.

Because of the monospar front wheel fork, which is preferably a compound construction, the manufacturing and assembly process of the bicycle is considerably simplified. Thus the monospar front wheel fork only consists of one part, and no more than three parts. Moreover, the front wheel can be assembled in a very simple manner without it at the same time being necessary to release the axle and the brake device from the monospar front wheel fork. The risk of damage to the brake device is therefore considerably reduced.

Moreover, because the wheel hub is designed as a half shell, the brake device is also reliably protected against external influences during operation of the bicycle, for example against contamination or mechanical damage. The brake reliability of the bicycle is thereby considerably increased.

According to an advantageous further development of the invention, the wheel hubs have an axial opening for attaching the wheels onto an axle extension, with the wheels each being secured by only one bolt which can be screwed axially into the wheel axle. Moreover, the axle extension and the axial opening can have a polyhedral or additionally a tapered design. By this means, assembly of both wheels is considerably simplified, because only a single bolt needs to be manipulated for each wheel. A wheel can therefore be changed very quickly without it being necessary to dismantle an axle or brake device, especially at the front wheel. Moreover, a reliable connection between the wheels and the respective wheel axles is maintained. According to another advantageous further development of the invention, brake devices are arranged in the wheel hubs of both wheels, which further increases the brake reliability of the bicycle.

The axle bearing devices and brake devices for the front and rear wheels preferably have an identical design, so that the manufacturing process of the bicycle is simplified. Moreover, this ensures that the front and rear wheels can be interchanged.

Each axle bearing device advantageously consists of a tube shaped element inside which a wheel axle is rotatably mounted by means of at least two ball bearing rings. The tube shaped element (wheel bearing hub), at its outer periphery, is connected to the front wheel holder or drive extension by means of a radial flange disk, with the brake device being arranged on the side, facing towards the wheel, of the flanged disk. This axle bearing device is characterised by being very compact and robust.

The brake device preferably has two semi-circular brake elements arranged in the shape of a circle, a first axle running parallel to the wheel axle, which first axle is firmly connected to the radial flanged disk, with the brake elements, at their ends, being rotatably mounted on the first axle, a second rotational axle which is located parallel to the wheel axle and arranged in the opposite end area of the brake elements and between the latter, which rotational axle has an asymmetrical cross section, and a lever which can be actuated by a cable line, which lever is firmly connected to the second rotational axle to spread the brake elements against a spring force by rotation of a second rotational axle. Moreover, the cable line for the front wheel brake preferably runs in the inside the monospar fork.

Such a brake device has the advantage that it can be arranged very tightly about the wheel axle and that no outer lever arm is required for absorbing the brake moment, which lever arm is normally fixed to the fork prong. On the contrary, the brake device can be arranged completely within the wheel hub. It is firmly connected to the radial flanged disk and is covered by the wheel hub designed in a half shell shape. The wheel hub can be released from the wheel axle together with the wheel without having to dismantle the brake device.

According to another advantageous further development, the brake device consists of a hydraulic brake device which is also arranged within the wheel hub. The actuating elements, for example pressure lines, can at the same time run inside the monospar fork or drive extension.

According to a further advantageous embodiment of the invention, the monospar fork consists of a steel tube which is slightly bent in the wheel axle area and onto the lower end of which is welded a steel cylinder about the cylinder axis of which the front wheel rotates. This construction is used as the basic element for the monospar fork and has elastic properties as a result of the slightly bent steel tube area. The steel cylinder is used for accommodating an axle bearing device which is preferably made of cast aluminum. A relatively light and yet stable monospar front wheel fork can be manufactured as a result of this compound construction.

The steel tube can also be advantageously enclosed in an aluminum casing which merges at opposite tube sides into T-shaped extension pieces. By this means, the stability in the tube area of the monospar fork can be increased still further.

To keep the weight of the bicycle as low as possible, the wheel hubs are made, for example, of aluminum and have a steel support on their inner periphery in the area of the brake elements, so that reliable brake operation is ensured and damage caused by the brake elements to the inner areas of the wheel hub is avoided.

According to a particularly advantageous further development of the bicycle according to the invention, transmitting devices, which are firmly connected to the axle bearing device, for switching on a brake light and for recording speed can additionally be arranged in the wheel hub, with the corresponding signal transmission lines running within the monospar fork or drive extension.

It has been shown that a particularly torsionally rigid and consequently reliable bicycle frame, which is also easy to manufacture, for accommodating the monospar fork is preferably fabricated from at least four shells located next to one another. Moreover, the shells can be made of sheet metal.

A particularly light bicycle is obtained by means of this bicycle frame in connection with the monospar fork.

The front wheel frame preferably consists of two inner shells which are provided with two openings and are welded to one another over an area and also to a tube shaped holder for accommodating the monospar fork and to a tube element for holding the saddle. Both inner shells are covered by outer shells which are at a distance from the inner shells at least over an area. The space between the innner shells and that between the inner and outer shells is expanded by means of a plastic. This plastic can additionally be reinforced, for example, with glass fiber. Moreover, the outer shells can have a considerably thinner design than the inner shells. Also, they do not need to be in direct contact with one another, because they are connected to one another by the plastic.

A holding device, which is firmly connected to the tube element, is provided in the lower area of the bicycle frame for accommodating the drive extension. This holding device is designed as a funnel with side walls running at a slope towards one another, into which funnel a correspondingly shaped part of the drive extension can be drawn. Inclined contact surfaces are arranged inside the holding device, and wedge elements run up on these inclined contact surfaces as they are moved towards one another by means of a screw device, with the wedge elements engaging in openings of the drive extension and driving the latter.

By means of this holding device, a very strong, detachable connection is obtained between the relatively light bicycle frame and the comparatively very solid drive extension.

Figure 5:
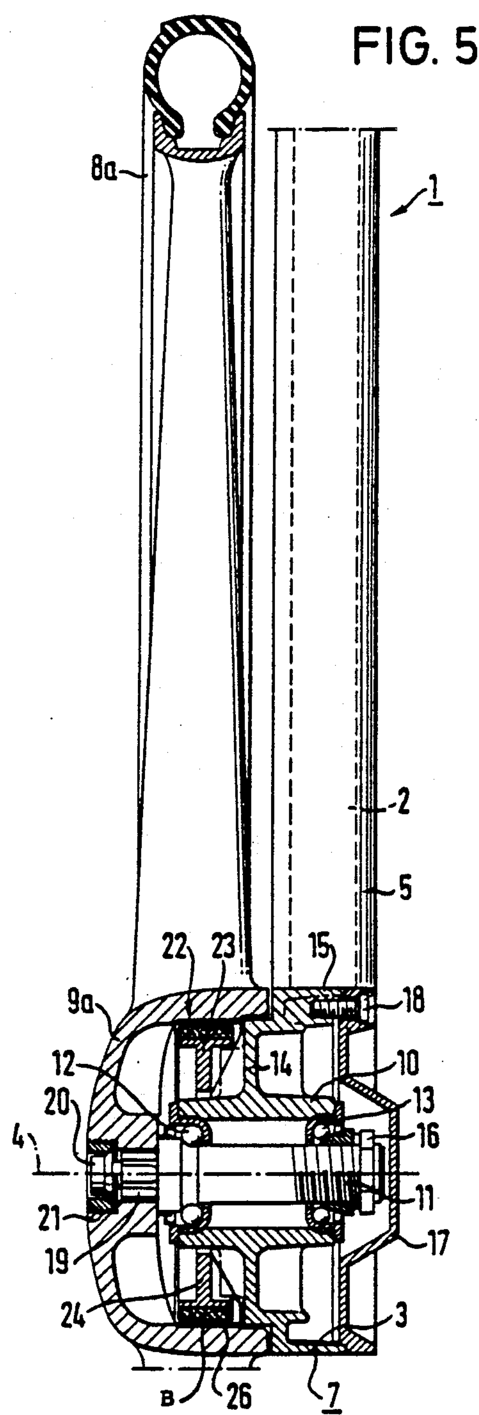
Figure 4:
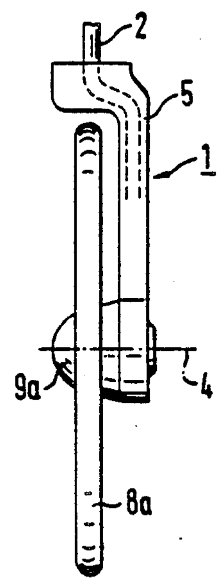
Figure 6:
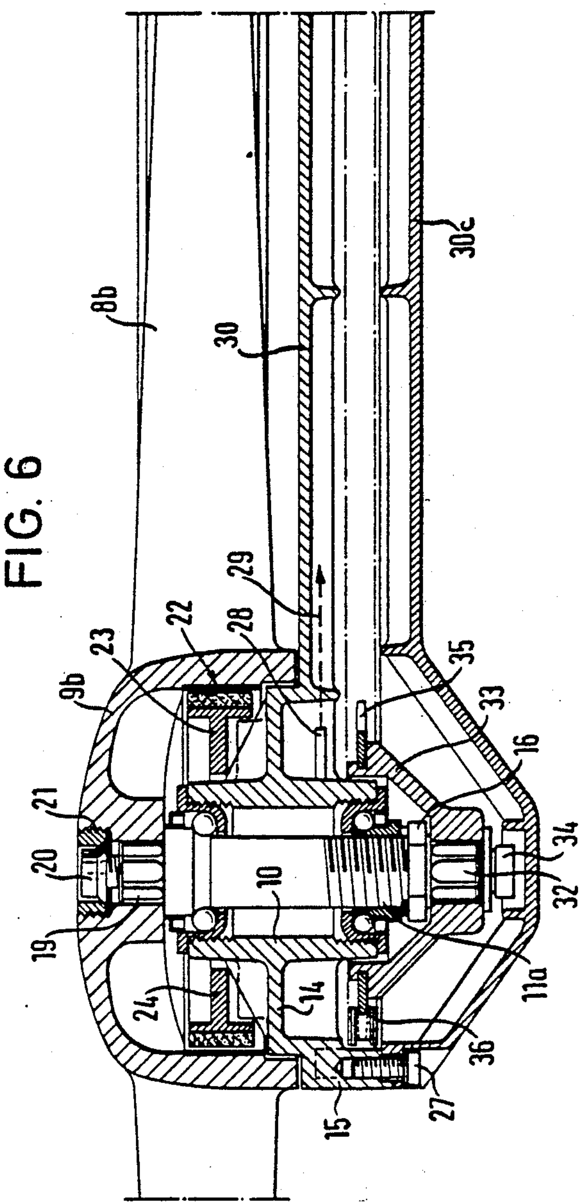
Figure 7:
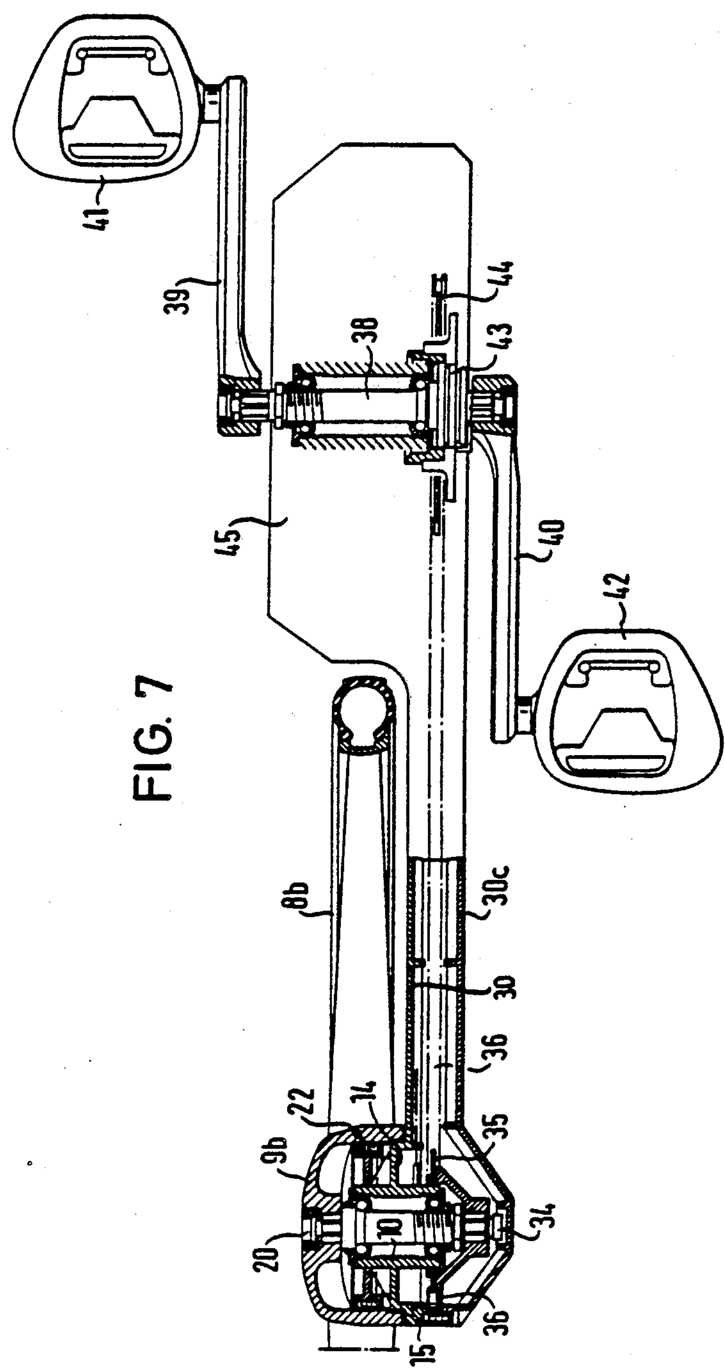
Figure 13:
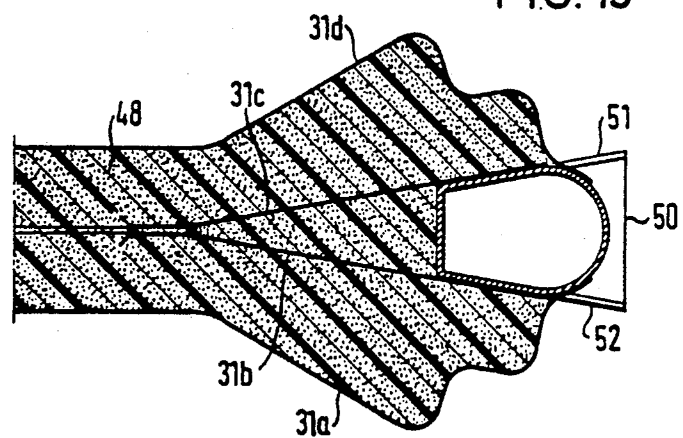
Figures 14, 15, 16:
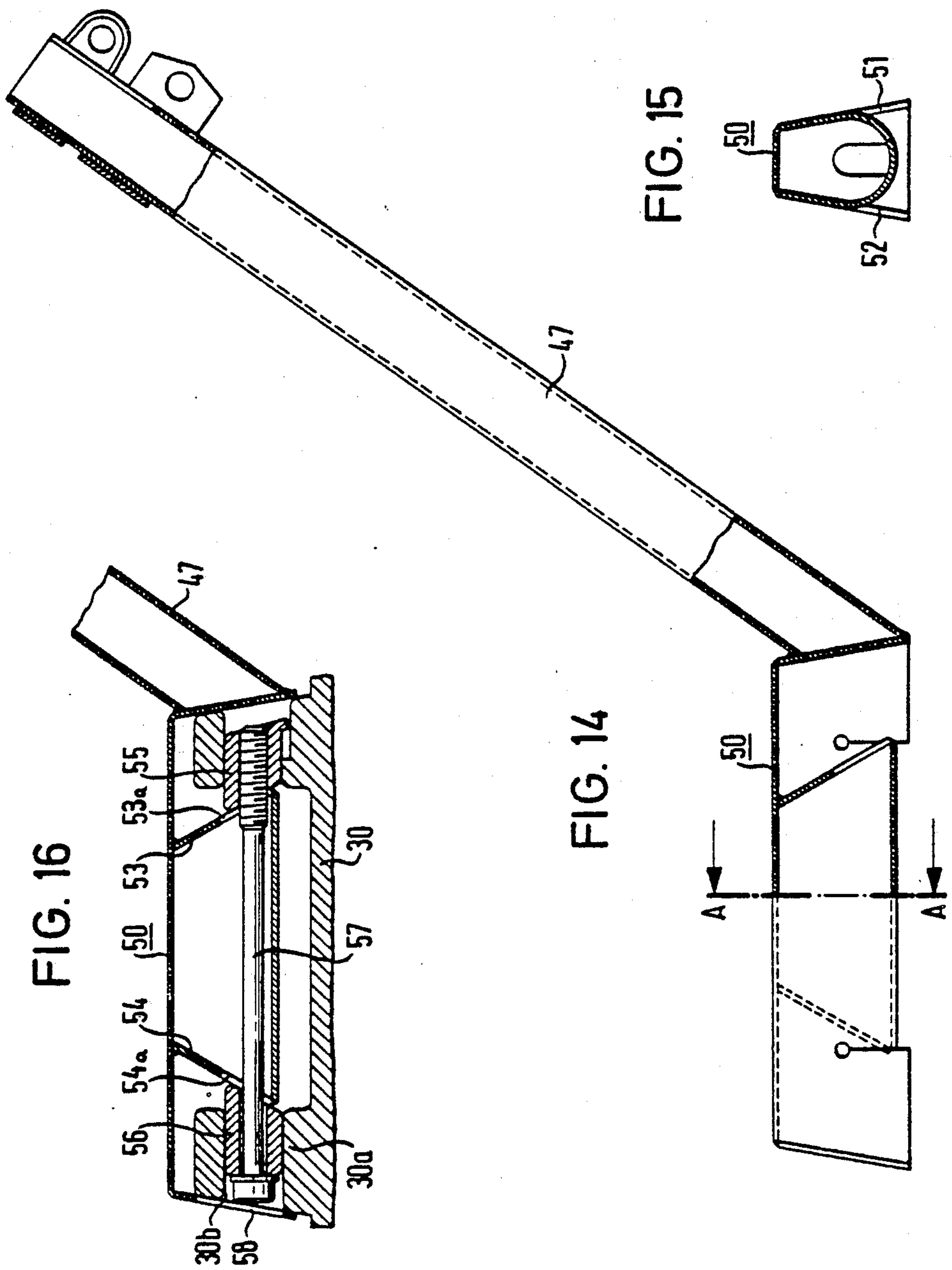

The following drawing shows an illustrative embodiment of the invention, wherein:

FIG. 1 shows a side view of the basic element of a monospar fork of the bicycle according to the invention, FIG. 2 shows a side view of the monospar fork in compound construction, FIG. 3 shows a cross section through the monospar front wheel fork along line C—C in FIG. 2, FIG. 4 shows a diagrammatic representation of the monospar fork from the front, FIG. 5 shows a section through the monospar fork, and the bicycle supported by it, in a plane containing the wheel axle, FIG. 6 shows a section through the drive extension and the rear wheel in a plane containing the rear wheel axle, FIG. 7 shows a section according to FIG. 6, with the area of the bicycle drive added, FIGS. 8 to 13 show the bicycle frame and some sections through the frame, FIGS. 14 and 15 show a holding device, which is connected to a tube element for holding the saddle, for accommodating the drive extension, and also a cross section through this holding device, and FIG. 16 shows a longitudinal section through the said holding device.

FIG. 1 shows in side view the basic construction of a monospar fork for the bicycle according to the invention. The monospar fork 1 consists of a basic element which comprises a rigid tube 2 and a hollow cylindrical part 3 which is firmly connected to the tube 2. Both parts 2 and 3 can be made, for example, of steel and can be firmly welded to one another. The center axis 4 of the cylindrical part 3 represents the later rotational axle of the bicycle and, in the present case, runs at right angles to the plane of the drawing. The tube shaped part 2 extends in a direction lying at right angles to the center axis 4 and is slightlfy bent at its lower end. Moreover, in the plane of the drawing, it merges at a tangent into the cylindrical part 3.

As a result of the bent part of the tube 2, the basic element shown has elastic properties and is used inter alia for accommodating an axle bearing device for the front wheel, which axle bearing device is arranged in the area of the cylindrical part 3 and is retained by the latter.

FIG. 2 shows a side view of the monospar fork for the bicycle according to the invention and with the basic element shown in FIG. 1. This basic element, in the area of the tube 2, is enclosed in a reinforcing casing 5 to increase the mechanical strength, which reinforcement casing is made, for example, of aluminum and which, at opposite tube sides, merges into T-shaped extension pieces 6, as shown in FIG. 3, which represents a section along the line C—C in FIG. 2. This compound design consisting of the steel tube 2 and the aluminum casing 5 together with the extension pieces 6 ensures a sample and stable method of construction of the said monospar front wheel fork.

As also shown in FIG. 2, the inner area of the cylindrical part 3 is used for accommodating an axle bearing device, which will be explained in greater detail in conjunction with FIG. 5. This axle bearing device can consist of, for example, a cast aluminum part 7 which is retained by the cylindrical part 3 and is connected in one piece to the aluminum casing 5 on the tube 2. A braking device for braking the front wheel 8a rotating about the center axis 4 is firmly connected to the cast aluminum part 7, as will be described in detail later.

FIG. 4 shows the basic construction of the monospar front wheel fork 1 for the bicycle according to the invention. It runs on only one side of the front wheel 8a and is shaped above the wheel in such a way that the tube 2 comes into a position within the wheel plane. This tube 2 is rotatably mounted in the bicycle frame and is also connected to a steering device (not shown). The front wheel 8a can be detached from one side of the monospar front wheel fork 1 and, with its wheel hub 9a, covers the axle bearing device or brake device connected to the monospar front wheel fork 1.

FIG. 5 shows a section through the front wheel 8a and the monospar fork 1, which section lies in one plane in which the center axis 4 also runs. The cast aluminum part 7 supported by the cylindrical part 3 has a tube shaped element 10 in the inside of which a wheel axle 11 is rotatably mounted coaxial with the center axis 4 by means of bearing devices 12 and 13. The bearing devices 12 and 13 are preferably ball bearing rings. The tube shaped element 10 has a radial flanged disk 14 attached centrally on its outer periphery, onto which flanged disk 14 is formed an outer ring 15 which grips around the cylindrical part 3 on the outside. Moreover, as already mentioned, the elements 10, 14 and 15 are connected in one piece to one another and firmly to the cylindrical part 3. On the side facing away from the front wheel 8a, the front wheel axle 11 is secured by means of a nut 16 from falling out of the tube shaped element 10 and is therefore permanently connected to the latter. On the same side, a cap 17 is provided which covers the cylindrical part 3 and consequently the front wheel axle 11. This cap 17, at its outer periphery, is connected in a suitable manner by screws 18 to the cast aluminum part 7.

On the side facing away from the cap 17, the front wheel axle 11 has an axle extension 19 which has a polyhedral and, moreover, tapered design. The wheel hub 9a firmly connected to the front wheel 8a can be attached onto this axle extension 19. In this connection, the wheel hub 9a has a corresponding axial opening which also has a polyhedral and tapered design which is suited to the axle extension 19. The wheel hub 9a can be connected to the front wheel axle 11 by means of an axial screw 20. By tightening the axial screw 20, the wheel hub 9a is drawn onto the taper of the axle extension 19, so that by this means a firm connection is obtained between the two parts. The head of the screw 20 can preferably be inserted into a blind hole 21 in the wheel hub 9a.

A brake device 22 is arranged beneath the wheel hub 9a and is preferably firmly connected to the radial flange 14, which brake device 22 is used for braking the front wheel 8a. This brake device 22 has two semicircular brake elements 23 and 24 arranged in the shape of a circle, which brake elements 23 and 24, during the braking operation, are pressed axially outwards and from the inside against the wheel hub 9a. The brake elements 23 and 24 are lined with brake linings B which can be pressed against a steel support 26 which is attached opposite the brake linings on the inner periphery of the wheel hub 9a. The wheel hub 9a is preferably made of aluminum, so that premature wear caused by the steel support 26 is avoided.

FIG. 2 shows in more detail how the brake elements 23 and 24 are designed and arranged beneath the wheel hub 9a. Both brake elements are rotatably arranged about a first axis 25 running parallel to the wheel axle, which axle 25 is firmly connected to the radial flange disk 14. Moreover, the brake elements 23 and 24 are mounted at their ends on this axle 25. A second rotational axle 27, which also runs parallel to the wheel axle, is arranged between the ends, opposite the axle 25, of the brake elements 23 and 24, which rotational axle 27 has an asymmetrical cross section outside its bearing area. The corresponding ends of the brake elements 23 and 24 are pressed against this rotational axle 27 by means of a spring device (not shown). In this connection, the brake elements 23 and 24 do not sit against the steel support 26. The rotational axle 27 secured by a nut is firmly connected to one end of a lever arm 28, from the other end of which a Bowden cable 29 or another suitable actuating element is guided through the tube 2 of the monospar fork 1 towards the steering device. The Bowden cable 29 can be tightened by a brake lever (not shown) arranged on the steering device, so that the rotational axle 27 is turned by the lever 28. Moreover, because of the asymmetrical cross section of the rotational axle 27, the brake elements 23 and 24 sitting against the rotational axle 27 are pressed apart, so that they now butt against the steel support 26 and effect a braking of the wheel 8a.

Instead of a drum brake, a hydraulic brake device can also be arranged inside the wheel hub 9a, the actuating elements of which brake device also run inside the monospar fork 1. This also correspondingly applies to the rear wheel, with the actuating elements or power transmission elements (eg. pressure lines) running within the drive extension 30.

Moreover, transmission devices for switching on a brake light and for recording speed can be arranged inside the wheel hub 9a and be firmly connected to the axle bearing device. The corresponding signal transmission lines (not shown) also run inside the tube 2 of the monospar fork 1.

FIG. 6 shows a section through the rear axle bearing device and the rear wheel 8b connected to it. This rear axle bearing device corresponds in its essential parts to the front axle bearing device, so that only the different design features are described hereinafter. Moreover, the same parts are provided with the same reference numbers.

The wheel hub 9b firmly connected to the rear wheel is attached onto the rear wheel axle 11a, as already described in connection with FIG. 5 with reference to the front wheel. Moreover, the tube shaped element 10, the radial flange 14 and the annular extension 15 are connected to the drive extension 30, which in turn is retained by the bicycle frame 31. In this respect, the wheels and the front and rear axle bearing devices are identical.

The rear wheel axle 11a, at its end opposite the rear wheel hub 9b, has a second axis extension 32 on which is arranged a hollow conical shaped drive element 33. This drive element 33 opens out in the direction of the bearing device. To fix the said drive element 33, the second axle extension 32 can be designed as a polyhedron and, moreover, also as a taper, so that a firm connection between the two said parts is obtained. To secure the drive element 33, an axia bolt 34 is provided, which prevents the drive element 33 from sliding off the axle extension 32.

The taper shaped drive element 33, in the area of its largest diameter, supports a gear rim 35 arranged coaxial to the rear axle 11*a*, on which gear rim 35 is arranged a chain 36 as an endless drive element. Moreover, the drive element 33, the gear rim 35 and the chain 36 are covered by the rear part of the cover 30*c* of the drive extension 30, which is secured at this location to the axle bearing device by means of screws 37. A brake device 22 is also connected to the rear axle bearing device, which brake device 22 is identical to the front brake device. In both brake devices, provision can of course by made for the second rotational axle 27 to be led through the radial flange 14 and connected at this location to the lever 28 (brake lever). Without being deflected, the Bowden cable 29 could then run into the tube 2 of the monospar fork 1 or into the drive extension 30.

If necessary, the rear axle bearing device can also contain transmission devices for a brake light and for recording speed, the connecting lines of which transmission devices also run through the drive extension 30.

The drive extension with the rear axle bearing device and the rear wheel 8*b* is shown in greater detail in FIG. 7. In its front area, it accommodates the drive device for the bicycle, which drive device consists of a rotatably mounted shaft 38 on the ends of which pedals 41 and 42 are arranged via lever arms 39 and 40. A gear rim or another suitable chain-drive element 44, which in the present case is only shown schematically and on which the chain 36 also rests, is arranged on a free wheel hub 43 which rests on the shaft 38. The drive device for the bicycle is hermetically enclosed by a protective housing 45 which belongs to the drive extension 30.

Figure 8:
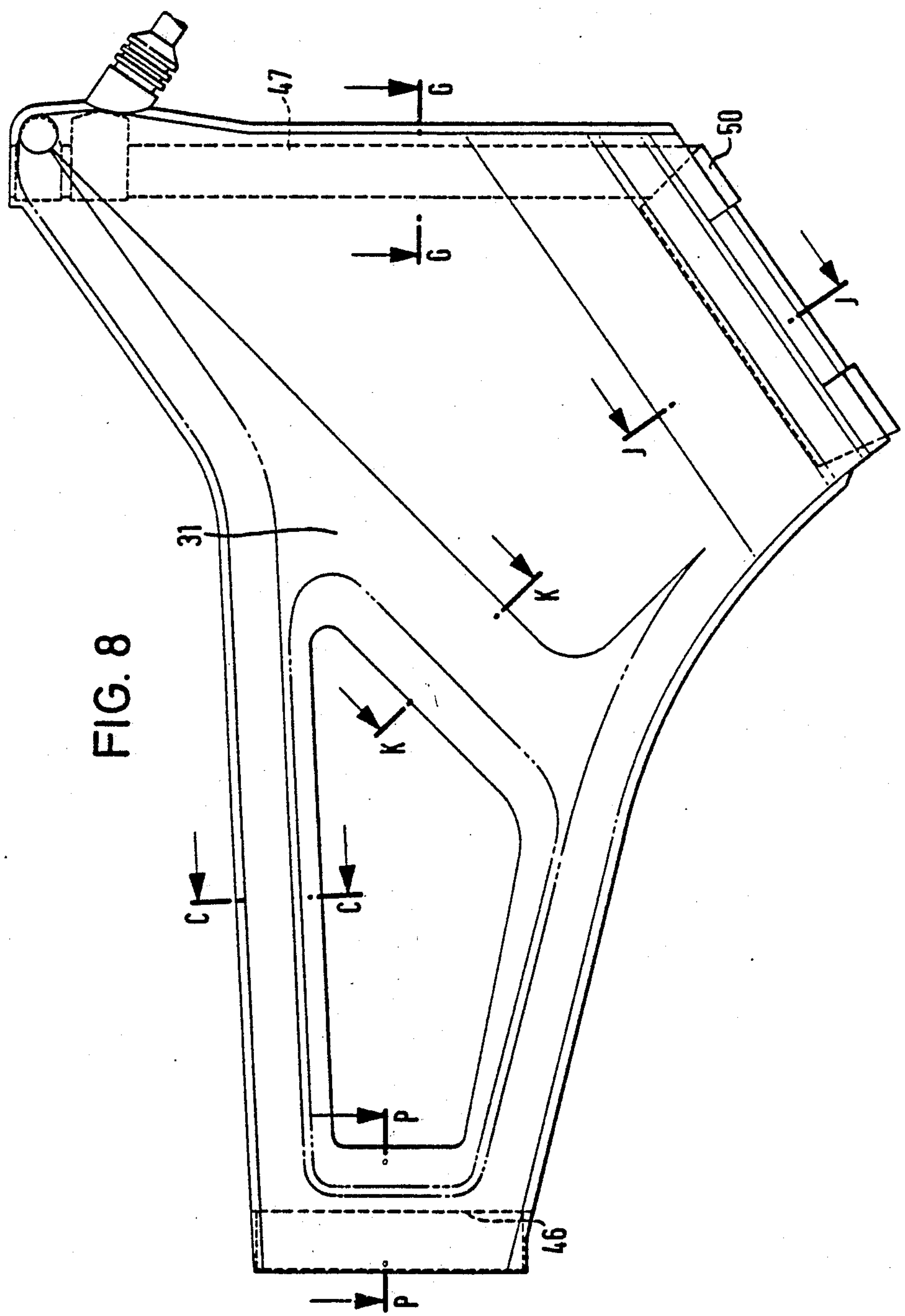
Figure 9:
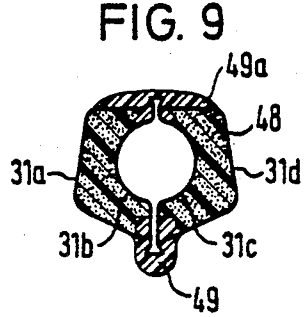
Figure 10:
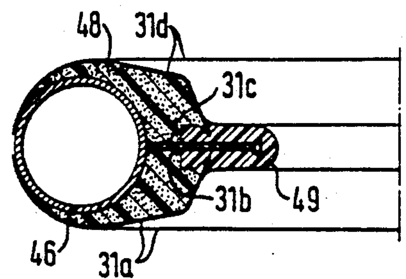
Figure 11:
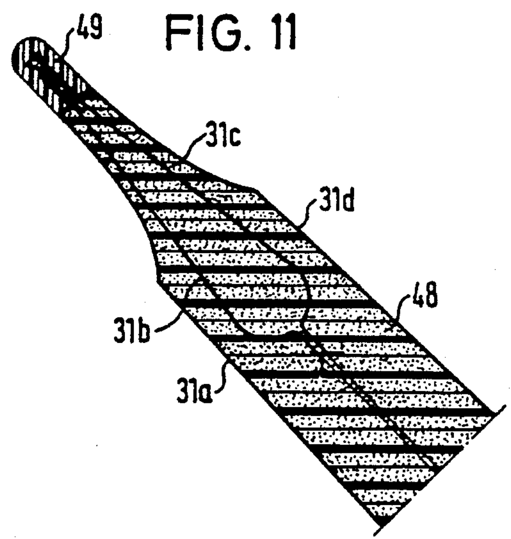
Figure 12:
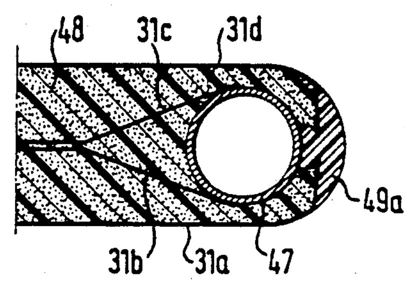

The drive extension 30 is connected to the bicycle frame 31, which is shown in FIG. 8, by a holding device which will be described in greater detail. This bicycle frame 31 is fabricated from four adjacently located shells 31*a*, 31*b*, 31*c* and 31*d* which are preferably made of metal. Moreover, the two outer shells can be thinner than the two inner shells. FIGS. 9 to 13 show various sections through the bicycle frame 31 along lines C—C, P—P, K—K, G—G and J—J. The two inner shells 31*b* and 31*c*, which are provided with openings, are welded to one another over an area and also to a tube shaped holder 46 for accommodating the monospar fork 1 and to a tube element 47 for holding the saddle (not shown). The inner shells 31*b* and 31*c* are covered by the outer shells 31*a* and 31*d* which are at a distance from the inner shells at least over an area, with the space between the inner shells 31*b* and 31*c* and that between the inner and outer shells or between the outer shells being expanded by means of a plastic 48. In addition, the plastic can be reinforced with glass fiber. If necessary, the edges of the four said shells can be provided with envelopes 49 and 49*a*.

By such a method of construction, a very torsionally rigid bicycle frame is obtained and in such a way that it can be advantageously used in connection with a monospar front wheel fork.

As already indicated in FIG. 8, a holding device 50 for accommodating the drive extension 30 is arranged on the lower end of the bicycle frame 31. This holding device 50 is firmly connected, for example welded, to the tube element 47 in order to accommodate the saddle. FIG. 13 shows a cross section along the line J—J in FIG. 8, so that it can be seen by which method the holding device 50 is connected to the bicycle frame 31. This holding device 50 has side walls 51 and 52 which run towards one another in a funnel shape and which are firmly connected to the inner shells 31*b* and 31*c* of the bicycle frame 31. The outer shells 31*a* and 31*d* are widened out in this area and then run wavelike towards the said side walls 51 and 52. They are also firmly connected to the holding device 50. Because the space between the individual shells is expanded, a very stable frame section is obtained in this area as a result of the special shaping of the inner and outer shells.

Above the drive device for the bicycle (38,43,44), the drive extension 30 has a suitably shaped extension which can be drawn into the funnel shaped opening in the holding device 50. This extension 30*a* also has side walls running towards one another in a wedge shape, which side walls, when connected to the bicycle frame 31, comes into contact against the side walls 51 and 52 of the holding device 50. FIGS. 14 and 15 show the holding device 50, together with the tube element 47, again separated from the bicycle frame 31. FIG. 16 shows a longitudinal section through this holding device 50. It has in the inside two inclined contact surfaces 53 and 54 which are provided with bores 53*a* and 54*a* and which run practically at right angles to the side walls 51 and 52. Wedge shaped elements 55 and 56 run up on these inclined contact surfaces 53 and 54 if they are moved towards one another by means of a screw device. Moreover, the wedge shaped elements 55 and 56 are positioned inside a bore in the extension 30*a* of the drive extension 30, so that they draw this extension 30*a* into the funnel shaped opening of the holding device 50. In this way, a strong, detachable connection is obtained between the relatively solid drive extension 30 and the bicycle frame 31. The screw device consists of a screw 57 which freely penetrates through one wedge element 56 and can be screwed into the other wedge element 55. Moreover, the screw 57 is located in the bore 30*b* of the wedge shaped extension 30*a* and also runs through the openings 51 and 52 in the inclined contact surfaces 53 and 54. To be able to turn the screw 57, an opening 58 is provided in the end face of the holding device 50, which is located opposite the tube element 47.

We claim:

1. A bicycle comprising:

a bicycle frame;

an identical front and rear wheel;

a front wheel holder designed as a monospar fork rotatably connected to the bicycle frame and tube shaped element attached to said monospar fork inside of which a wheel axle is mounted by means of bearing devices on which axle the front wheel can be attached;

a single arm drive extension connected to the bicycle frame, which drive extension, at its rear end, has a drive device in communication with a rear wheel and which drive extension has a tube shaped element inside of which a wheel axle is mounted by means of bearing devices onto which axle the rear wheel can be attached from one side; and a brake device;

wherein:

the wheels have wheel hubs which are designed in half shell shapes and are open towards the axle bearing devices, the hubs having a polyhedron shaped axial opening for attaching the wheels onto a tapered axle extension, the wheels being secured by a screw which can be screwed axially into the wheel axle;

the half shell shaped hubs housing a brake device secured to the axle bearing devices, which brake device can be pressed against the inner peripheral surface of the wheel hub in order to brake the bicycle; and the rear wheel drive being connected to the end of the rear wheel axle opposite to the rear wheel hub inside the drive extension.

2. A bicycle as claimed in claim 1, wherein brake device are arranged in the wheel hubs of both wheels.

3. A bicycle as claimed in claim 2, wherein the axle bearing devices and the brake devices for the front and rear wheels are identical.

4. A bicycle as defined in claim 2, further comprising a cable line for the front wheel brake disposed within the monospar fork.

5. A bicycle as claimed in claim 1, wherein the monospar fork comprises a tube which is slightly bent in the wheel axis area and onto the lower end of which is attached a cylinder about the axis of which the front wheel rotates.

6. A bicycle as claimed in claim 5, wherein the cylinder supports the axle bearing devices.

7. A bicycle as claimed in claim 5, wherein the tube is enclosed in a casing which, at opposite tube sides, merges into T-shaped extension pieces.

8. A bicycle as claimed in claim 1, further comprising a support on the inner periphery of the wheel hubs in the area of the brake elements.

9. A bicycle as claimed in claim 1, further comprising transmission devices for switching on a brake light and for recording the speed of the bicycle, said transmission devices arranged in the wheel hub and firmly connected to the axle bearing device, with corresponding signal transmission lines running inside the monospar fork and the drive extension respectively.

10. A bicycle as claimed in claim 1, wherein the bicycle frame comprises at least four adjacently located shells.

11. A bicycle as claimed in claim 10, wherein two inner shells which are provided with openings, are attached to one another over an area and also to a tube shaped holder for accommodating the monospar fork and to a tube element for holding a saddle, wherein both inner shells are covered by outer shells which are at a distance from the inner shells at least over an area.

12. A bicycle as claimed in claim 11, wherein the bicycle frame, in the lower area, accommodates a holding device firmly connected to the tube element in order to accommodate the drive extension.

13. A bicycle as claimed in claim 12, wherein the holding device is designed as a funnel having side walls running at a slope towards one another, into which side walls a correspondingly shaped part of the drive extension can be drawn.

14. A bicycle as claimed in claim 13, wherein inclined contact surfaces are arranged inside the holding device, and wedge elements run up on these inclined contact surfaces if they are moved towards one another by means of a screw device, and wherein the wedge elements engage in openings of the drive extension and drive the latter.

* * * * *